United States Patent Office 2,794,050
Patented May 28, 1957

2,794,050

DITHIA-DIOXO-HYDROCARBONS

Ralph B. Thompson, Hinsdale, Ill., assignor to Universal Oil Products Company, Des Plaines, Ill., a corporation of Delaware No Drawing. Application November 17, 1953,
Serial No. 392,738

9 Claims. (Cl. 260—586)

This application is a continuation-in-part of my co-pending application Serial No. 175,019, filed July 20, 1950, now abandoned, and relates to novel compositions of matter.

The novel compositions of matter comprise certain dithia-diketones in which the keto and sulfur groups are in a specific relation to each other.

In a specific embodiment the present invention relates to a novel composition of matter comprising a 4,6-dithia-1,9-diketone.

In a more specific embodiment the present invention relates to a novel composition of matter comprising 5,7-dithia-6,6-dimethyl-2,10-diketoundecane.

The novel compositions of matter may be illustrated by the following general formula:

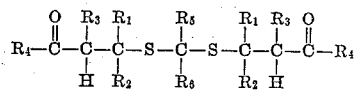

wherein each of $R_1$, $R_2$, $R_3$, $R_4$, $R_5$ and $R_6$ is separately and independently selected from the members of groups consisting of hydrogen, hydrocarbon, substituted hydrocarbon, heterocyclic and substituted heterocyclic groups. The hydrocarbon group preferably is selected from alkyl, alkenyl, cycloalkyl, cycloalkalkyl, alkcycloalkyl, aryl, alkaryl and aralkyl. The substituted groups may contain such radicals as hydroxyl, amino, monoalkylamino, dialkylamino, etc.

In another form of the invention, $R_1$ and $R_4$ may comprise carbon atoms forming a polymethylene ring.

It will be noted from the general formula hereinbefore set forth that the keto groups are attached to carbon atoms in positions beta to the sulfur atoms and the sulfur atoms are attached to the same carbon atom. This specific configuration is present in all of the novel compositions of the present invention and is essential thereto. These compounds are thioacetals (mercaptals and mercaptols) and are distinguished from thioethers (sulfides). The diacetals may be hydrolyzed with dilute acids to yield the starting materials, whereas the thioethers are stable under the same conditions.

The novel compositions of the present invention may be used as intermediates in various organic synthesis. Furthermore, these compounds are useful as antioxidants in retarding oxidative deterioration of organic compounds, including edible fats and oils, motor fuel and particularly cracked gasoline, polymer gasoline, etc. diesel oil, mineral oil, lubricating oil, fuel oil, drying oil, greases, rubber, etc.

The novel compounds of the present invention may be prepared in any suitable manner. In a preferred method, these compounds are prepared by reacting an alpha-beta-unsaturated carbonyl compound; namely, an alpha-beta-unsaturated ketone or an alpha-beta-unsaturated aldehyde, with hydrogen sulfide to form a mercapto-carbonyl compound, which then is condensed with a carbonyl compound, particularly a ketone, so that two molecular proportions of the mercapto-carbonyl compound combine with one molecular proportion of the carbonyl compound to form dithia-1,9-diketone which also may be referred to as a dithia-diketoalkane.

The carbonyl compounds used as starting materials for reaction with hydrogen sulfide according to the present process include both aldehydes and ketones which may be represented by the formula:

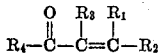

wherein $R_1$, $R_2$, $R_3$ and $R_4$ each separately and independently represents a member of the group consisting of hydrogen, hydrocarbon and heterocyclic groups. The hydrocarbon groups which are represented by $R_1$, $R_2$, $R_3$ and $R_4$ include alkyl, alkenyl, cycloalkyl, cycloalkalkyl, alkcycloalkyl, aryl, alkaryl and aralkyl. The heterocyclic rings which are represented also by $R_1$ to $R_4$ include a thiophene ring, a furan ring, a pyridine ring, etc. In general, alpha-beta-unsaturated ketones are preferred and particularly those in which $R_4$ represents a hydrocarbon group and each of $R_1$, $R_2$ and $R_3$ represents a hydrogen atom, or $R_1$ and $R_3$ represent hydrogen atoms and $R_2$ represents a hydrocarbon group, particularly an alkyl group.

The reaction of hydrogen sulfide with an alpha-beta-unsaturated ketone is effected readily by contacting these reacting materials generally at a temperature of from about 0° to about 100° C. and preferably in the presence of a catalyst. Ketones containing at least one hydrogen atom combined with the carbon atom in beta position to the keto group react readily with hydrogen sulfide in the presence of a basic catalyst such as piperidine, sodium methylate, quaternary ammonium hydroxides, and other basic acting catalysts. In some cases, it is desirable to heat the reaction mixture at a temperature of from about 50° to about 100° C. in order to promote the reaction. In most cases it is necessary to use a large excess of hydrogen sufide in order to avoid reaction of two molecules of alpha-beta-unsaturated ketone with one molecule of hydrogen sulfide.

The mercapto-carbonyl compounds and particularly mercapto-ketones, while formed by reacting hydrogen sulfide with an alpha-beta-unsaturated carbonyl compound, are condensed with an aldehyde or a ketone as hereinabove set forth to form a dithia-1,9-diketone. This condensation of a mercapto ketone with another carbonyl compound which does not contain sulfur, is carried out by contacting two molecular proportions of the mercapto ketone with one molecular proportion of the other carbonyl compound in the presence of an acid catalyst and at a temperature of from about 0° to about 100° C. The resultant condensation product is then separated from any unconverted starting material which may be present in the reaction mixture.

The following specific preparations are illustrative of the large number of compounds which may be prepared and used within the scope of the present invention. It is understood that all of these compounds are not necessarily of equivalent activity for all uses. These compounds are prepared in accordance with the general procedure hereinbefore set forth.

The following specific compounds comprise those in which $R_1$, $R_2$ and $R_3$ are hydrogen and $R_4$, $R_5$ and $R_6$ are alkyl groups. 5,7-dithia-6,6-dimethyl-2,10-diketoundecane is prepared by the reaction of methyl vinyl ketone with hydrogen sulfide to form methyl beta-mercaptoethyl ketone, followed by condensation of two molecules thereof with one molecule of acetone. 6,8-dithia-7,7-dimethyl-3,11-diketotridecane is prepared by the reaction of ethyl vinyl ketone with hydrogen sulfide to form ethyl beta-mercaptoethyl ketone which then is condensed with acetone. 7,9-dithia-8,8-dimethyl-4,12-diketopentadecane is prepared by the reaction of propyl vinyl ketone with hydrogen sulfide to form propyl beta-mercaptoethyl ketone and condensation thereof with acetone. 8,10-dithia-9,9-dimethyl-5,13-diketoheptadecane is prepared by the reaction of butyl vinyl ketone with hydrogen sulfide to form butyl beta-mercaptoethyl ketone which subsequently is condensed with acetone. Similarly, dithia-diketononadecane, dithia-diketoheneicosane, dithia-diketotricosane, dithia-diketopentacosane, etc., may be prepared by utilizing, as starting material, amyl vinyl ketone, hexyl vinyl ketone, heptyl vinyl ketone, octyl vinyl ketone, etc.

In the compounds of the preceding paragraph, acetone is the carbonyl compound utilized in the final condensation step. In the following compounds, different ketones are utilized. Thus, 5,7-dithia-6-methyl-6-ethyl-2,10-diketoundecane is prepared by the reaction of methyl vinyl ketone with hydrogen sulfide and subsequent condensation thereof with methyl ethyl ketone. 5,7-dithia-6,6-diethyl-2,10-diketoundecane is prepared by the condensation of the methyl beta-mercaptoethyl ketone (prepared by reacting methyl vinyl ketone with hydrogen sulfide) with diethyl ketone. Similarly, 5,7-dithia-6-methyl-6-propyl-2,10-diketoundecane is prepared by utilizing methyl propyl ketone in the final condensation, and 5,7-dithia-6-ethyl-6-butyl-2,10-diketoundecane is prepared by utilizing ethyl butyl ketone in the final condensation step.

As illustrative of compounds in which $R_1$, $R_2$, $R_4$, $R_5$ and $R_6$ are alkyl groups and $R_3$ is hydrogen, 5,7-dithia-4,4,6,6,8,8-hexamethyl-2,10-diketoundecane may be prepared by the reaction of mesityl oxide with hydrogen sulfide and condensation of two molecules of intermediate product with one molecule of acetone. Similarly, 5,7-dithia-4,6,6,8-tetramethyl-4,8-diethyl-2,10 - diketoundecane may be prepared by the reaction of methyl (methylethylvinyl) ketone with hydrogen sulfide, followed by condensation with acetone. In place of acetone other ketones may be used in the preparation of the novel compounds of the present invention. Thus, in the following compounds mesityl oxide is reacted with hydrogen sulfide and the intermediate product may be reacted with methyl ethyl ketone, diethyl ketone, methyl propyl ketone or ethyl butyl ketone to yield, respectively, 5,7-dithia-4,4,6,8,8 - pentamethyl-6-ethyl - 2,10 - diketoundecane, 5,7-dithia-4,4,8,8-tetramethyl-6,6-diethyl - 2,10 - diketoundecane, 5,7 - dithia-4,4,6,8,8-pentamethyl-6-propyl-2,10-diketoundecane or 5,7-dithia-4,4,8,8-tetramethyl-6-ethyl-6-butyl-2,10-diketoundecane.

The following compounds illustrate those in which $R_4$ comprises an alkenyl radical. Allyl vinyl ketone is reacted with hydrogen sulfide and two molecules of the resultant product is condensed with one molecule of acetone to yield 7,9-dithia-8,8-dimethyl-4,12-diketopentadecadiene-1,14. When utilizing methallyl vinyl ketone as the initial reactant and final condensation with acetone, the product is 7,9-dithia-3,8,8,13-tetramethyl-4,12-diketopentadecadiene-1,14. Similarly, when starting with crotyl vinyl ketone, the product will be 8,10-dithia-9,9-dimethyl-5,13-diketoheptadecadiene-2,15. When allyl vinyl ketone is reacted with hydrogen sulfide and the intermediate product is condensed with ethyl butyl ketone, the final product will be 7,9-dithia-8-ethyl-8-butyl-4,12-diketopentadecadiene-1,14.

As representative of compounds in which $R_4$ is a cycloalkyl radical, 4,6-dithia-1,9-dicyclohexyl-5,5-dimethyl-1,9-diketononane may be prepared by the reaction of cyclohexyl vinyl ketone with hydrogen sulfide and condensation of two molecular proportions of the intermediate product with one molecular proportion of acetone. Similarly, 4,6-dithia-1,9-dicyclohexyl-5-methyl - 5 - butyl-1,9-diketononane is prepared by the condensation of cyclohexyl vinyl ketone with hydrogen sulfide and condensation of the intermediate product with methyl butyl ketone. A compound containing an alkcycloalkyl radical may be prepared by the reaction of ethylcyclohexyl vinyl ketone with hydrogen sulfide and condensation of the intermediate product with acetone to yield 4,6-dithia-1,9-di-(ethylcyclohexyl)-5,5-dimethyl-1,9-diketononane.

As illustrative of compounds containing aryl groups, 4,6-dithia-1,9-diphenyl-5,5-dimethyl - 1,9 - diketononane may be prepared by the reaction of phenyl vinyl ketone with hydrogen sulfide to form phenyl beta-mercaptoethyl ketone, followed by condensation of two molecules thereof with one molecule of acetone. Similarly, 4,6-dithia-1,9-dinaphthyl-5,5-dimethyl-1,9-diketononane may be prepared by the reaction of naphthyl vinyl ketone with hydrogen sulfide and subsequent condensation with acetone. Illustrative compounds in which $R_1$ and $R_4$ are phenyl radicals, 4,6 - dithia-1,3,7,9-tetraphenyl-1,9-diketononane may be prepared by the reaction of benzalacetophenone with hydrogen sulfide and subsequent condensation with acetone. Illustrative of compounds in which $R_1$ is phenyl and $R_4$ is alkyl, 5,7-dithia-4,8-diphenyl, 2,10-diketoundecane is prepared by the reaction of benzalacetone with hydrogen sulfide and condensation of the intermediate product with acetone. In 4,6-dithia-1,3,7,9-tetraphenyl-3,5,5,7-tetramethyl-1,9-diketononane, $R_1$, $R_5$ and $R_6$ are alkyl groups and $R_2$ and $R_4$ are phenyl groups. This compound is prepared by the reaction of dypnone with hydrogen sulfide, followed by condensation of the intermediate product with acetone. Compounds containing alkaryl groups are illustrated by 4,6-dithia-1,9-ditolyl-5,5-dimethyl-1,9-diketononane, which may be prepared by the reaction of tolylvinyl ketone with hydrogen sulfide and condensation of the intermediate product with acetone. Similarly, 4,6-dithia-1,9-dixylyl-5,5-dimethyl-1,9-diketononane is prepared by the reaction of xylyl vinyl ketone with hydrogen sulfide and subsequent condensation with acetone.

As illustrative of compounds containing heretocyclic groups, 4,6-dithia-3,7-diphenyl-1,9-difuryl - 1,9-diketononane may be prepared by the reaction of benzalacetofurane with hydrogen sulfide and subsequent condensation of two molecular proportions of the product with one molecular proportion of acetone. As illustrative of compounds in which $R_1$ and $R_4$ comprise carbon atoms forming a polymethylene ring, dimethyl bis-(3-ketocyclohexylthio)-methane may be prepared by the reaction of cyclohexenone-2 with hydrogen sulfide and subsequent condensation with acetone.

While the ketones generally are preferred as reactants, it is understood that aldehydes may be used as the initial reactant and/or as the carbonyl compound in the final condensation. Thus, 4,6-dithia-5,5-dimethylnonane-1,9-dial may be prepared by the reaction of acrolein with hydrogen sulfide and condensation of two molecules of the product with one molecule of acetone. 4,6-dithia-3,5,5,7-tetramethylnonane-1,9-dial may be prepared by the reaction of crotonaldehyde with hydrogen sulfide and subsequent condensation of the intermediate product with acetone. Similarly, 4,6-dithia-3,7-diphenylnonane - 1,9-dial may be prepared by the reaction of cinnamaldehyde with hydrogen sulfide and subsequent condensation with acetone. Other compounds may be prepared by starting with different alpha-beta-unsaturated aldehydes and by using different ketones or aldehydes in the final condensation step.

The following compounds illustrate those in which an alpha-beta-unsaturated ketone is utilized as the starting reactant and an aldehyde is used in the final condensation step of the process. Thus, 5,7-dithia-6-phenyl-2,10-diketoundecane may be prepared by the reaction of methyl vinyl ketone with hydrogen sulfide and subsequent condensation of two molecules of the intermediate product with one molecule of benzaldehyde. Similarly, mesityl oxide may be reacted with hydrogen sulfide and the intermediate product is condensed with n-butyraldehyde to yield 5,7-dithia-4,4,8,8-tetramethyl-6-propyl-2,10-diketoundecane. The following compounds are representative of those utilizing an alpha-beta-unsaturated aldehyde as the initial reactant and an aldehyde in the final condensation step. Thus, 4,6-dithia-5-propyl-1,9-diketononane may be prepared by the reaction of acrolein with hydrogen sulfide and subsequent condensation of two molecular proportions of the intermediate product with one molecular proportion of n-butyraldehyde. 4,6-dithia-3,5,7-triphenyl - 1,9-triphenyl-1,9-diketononane may be prepared by the reaction of cinnamaldehyde with hydrogen sulfide, followed by condensation of the intermediate product with benzalaldehyde.

The following examples are introduced to illustrate further the novelty and utility of the present invention but not with the intention of unduly limiting the same.

Example I 5,7-dithia-6,6-dimethyl-2,10-diketoundecane was prepared by the two-step process represented by the following equations:

(1)
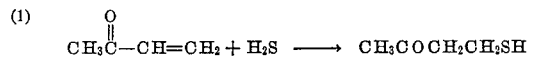

(2)
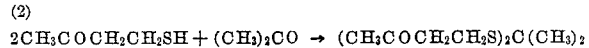

According to Equation 1 methyl vinyl ketone is reacted with hydrogen sulfide in the presence of piperidine to form methyl beta-mercaptoethyl ketones, and then according to Equation 2 two molecular proportions of this mercapto-ketone are reacted with one molecular proportion of acetone in the presence of anhydrous hydrogen chloride to form 6,6-dimethyl-5,7-dithia-2,10-diketoundecane. The product had a refractive index $n_D^{22}$ 1.5412.

Example II

In order to show the inhibitor potency of the dithia-diketoundecane prepared in accordance with Example I, small quantities of this compound were added to lard which had a normal stability period of 5 hours. Upon the addition of the inhibitor, the stability period of the lard was increased as follows:

| Wt. of Additive | 0.0 | 0.005 | 0.01 | 0.02 |
|---|---|---|---|---|
| Normal stability period, hours | 5 | 8 | 14 | 26 |

The stability period of the lard was determined by the Swift test, which is described in detail in the article by A. E. King, H. L. Roschen, and W. H. Irwin, in the Oil and Soap, vol. X, No. 6, pages 106–109 (1933), and modified as described in the article by R. W. Reimenschneider, J. Turer and R. M. Spec, which appeared in the Oil and Soap, pages 169, 171, September 1943. In general, the test comprises bubbling air through a sample of the lard until rancidity is determined organoleptically and by peroxide value, the lard being limited to a peroxide number of 20.

Example III 5,7-dithia-4,4,8,8-tetramethyl - 6 - propyl - 2,10 - diketoundecane was prepared by reacting mesityl oxide with hydrogen sulfide and subsequent condensation with n-butyraldehyde. The reaction of mesityl oxide with hydrogen sulfide was effected by adding 40% sodium methylate in methanol to mesityl oxide and passing hydrogen sulfide into the mixture, accompanied by rapid stirring. An excess of hydrogen sulfide is unnecessary in this instance, since the two groups on the β-carbon atom hinder formation of the thiadiketone. While the hydrogen sulfide was being added, additional sodium methylate was added. After the reaction had been completed, the reaction mixture was washed with dilute sulfuric acid and with water. The product was distilled in vacuum to yield 2-methyl-2-mercapto-4-pentanone.

7.2 gms. of n-butyraldehyde was added to 26.4 gms. of 2-methyl-2-mercapto-4-pentanone. The mixture was cooled in an ice bath and then saturated with anhydrous hydrogen chloride. The reaction mixture was dissolved in ether, and the water formed during the reaction was removed. The ether solution was washed with dilute sodium bicarbonate until all of the acid was removed, and then was washed with water and dried over sodium sulfate. The product had a refractive index $n_D^{22}$ 1.5055.

Example IV 4,6-dithia-3,5,5,7-tetramethylnonane-1,9-dial is prepared by reacting crotonaldehyde with hydrogen sulfide, separating the resultant mercapto aldehyde, and reacting two molecular proportions thereof with one molecular proportion of acetone.

I claim as my invention:

1. A dithia-dioxo-hydrocarbon having the following general formula:

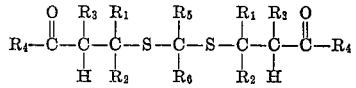

wherein each of $R_1$, $R_2$, $R_3$, $R_4$, $R_5$ and $R_6$ is separately and independently selected from the group consisting of hydrogen and hydrocarbon radicals.

2. A 5,7-dithia-2,10-diketoundecane which is free of non-hydrocarbon substituents.

3. 5,7-dithia-6,6-dimethyl-2,10-diketoundecane.

4. 5,7 - dithia-4,4,6,6,8,8-hexamethyl-2,10-diketoundecane.

5. 5,7 - dithia-4,4,8,8-tetramethyl-6-propyl-2,10-diketoundecane.

6. A 4,6-dithia-1,9-diketononane which is free of non-hydrocarbon substituents.

7. 4,6 - dithia-1,9-dicyclohexyl-5,5-dimethyl-1,9-diketononane.

8. A 4,6-dithia-1,9-diphenyl-1,9-diketononane which is free of non-hydrocarbon substituents.

9. A dithia-diketone free of non-hydrocarbon substituents and having in its structure the following arrangement of carbon, sulfur and oxygen atoms:

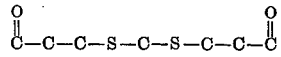

References Cited in the file of this patent

UNITED STATES PATENTS

| | | |
|---|---|---|
| 2,010,828 | Rothrock | Aug. 13, 1935 |
| 2,492,335 | Chenicek et al. | Dec. 27, 1949 |
| 2,492,336 | Thompson et al. | Dec. 27, 1949 |